Figure 1:
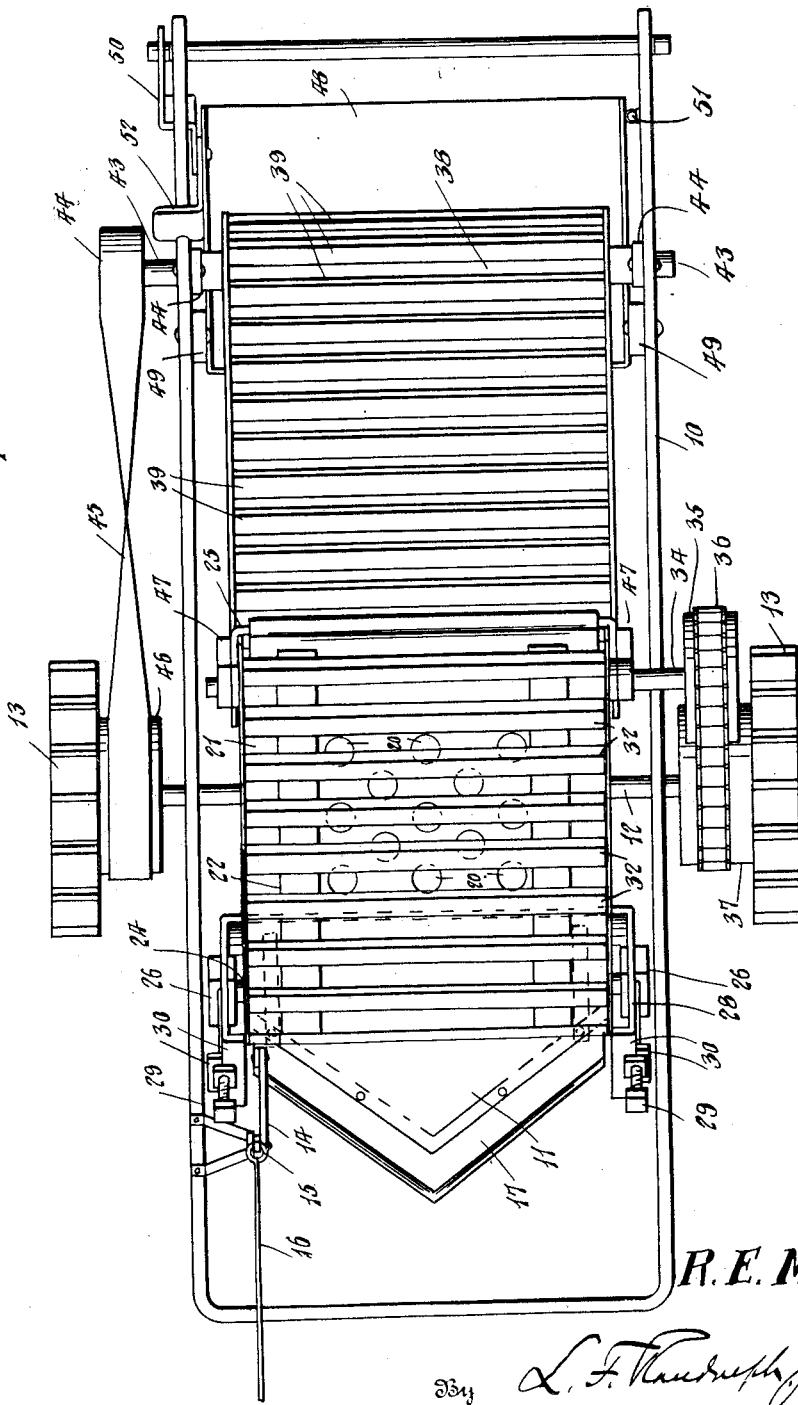

May 16, 1933.　　　　R. E. MONROE　　　　1,909,211
JOHNSON GRASS ROOT DIGGER
Filed March 31, 1932　　　2 Sheets-Sheet 1

Inventor
R. E. Monroe.
By L. F. Randolph, Jr.
Attorney

May 16, 1933.                    R. E. MONROE                    1,909,211
                            JOHNSON GRASS ROOT DIGGER
                            Filed March 31, 1932            2 Sheets-Sheet 2
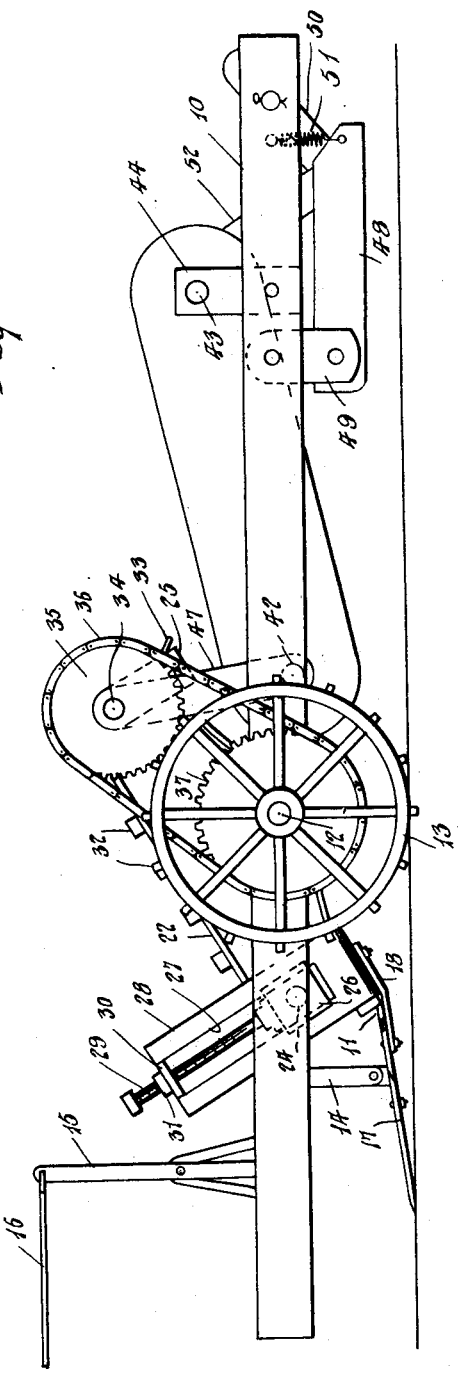
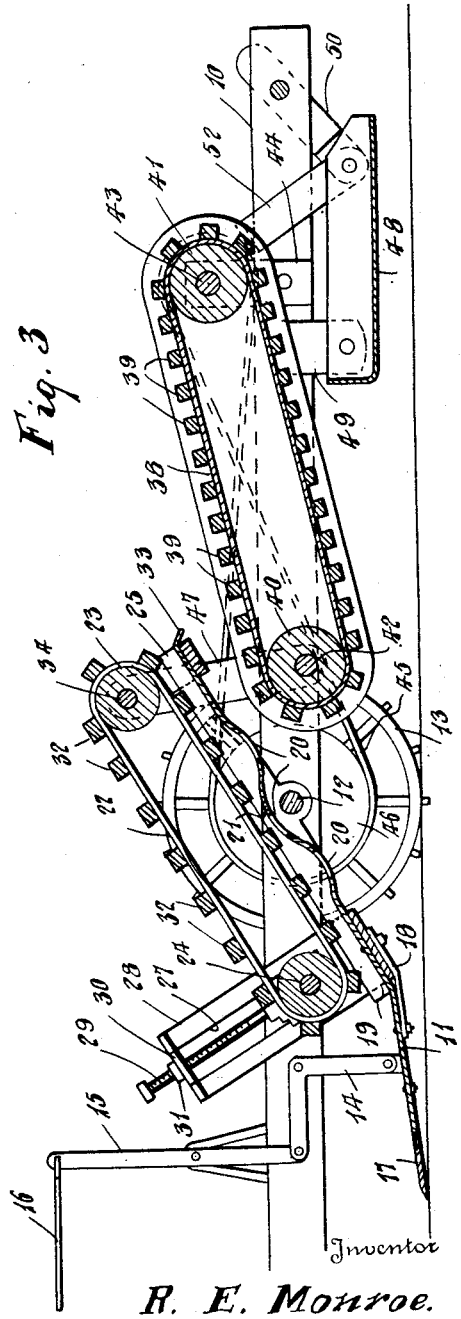
Inventor
R. E. Monroe.
By L. F. Randolph, Jr.
Attorney Patented May 16, 1933

1,909,211

UNITED STATES PATENT OFFICE

RALPH E. MONROE, OF CAMP VERDE, ARIZONA

JOHNSON GRASS ROOT DIGGER

Application filed March 31, 1932. Serial No. 602,279.

The invention relates to an agricultural machine for gathering for destruction roots of Johnson grass and other weeds and has for its object the provision of a machine that is reasonable in cost of manufacture and upkeep, and that is extremely effective in eradicating weed roots.

A further object of the invention is the provision of a machine of the class stated having a scoop blade or plow adapted to scoop up the soil and weed roots after the land has been plowed, and to separate the roots from the soil, returning the soil to the field and delivering the roots to an automatic stacker or bundler that is so constructed that the predetermined weight of roots will automatically deposit the roots in a pile in the field.

A further object of the invention is the provision in a machine of the character stated having a scoop blade or plow provided with transverse undulations or corrugations and openings so that the soil and roots will be agitated in passage over the blade to separate the soil from the roots and return the soil to the field through the openings, the roots being conveyed rearwardly for gathering and destruction.

The invention will be described in detail hereinafter and will be found illustrated in the accompanying drawings, in which Figure 1 is a top plan view of the improved machine, Figure 2 is a side view in elevation, and Figure 3 is a longitudinal vertical sectional view.

In the drawings similar reference characters are used to designate corresponding parts in all the views.

The improved weed root or Johnson grass root digger includes a frame 10 that is adapted to be hitched to a tractor or otherwise drawn over the field, it being designed that the machine shall be used after the soil has been broken up by plowing preliminary to planting a crop, and the blade 11 in the nature of a scoop is pivotally mounted on the axle 12 carrying traction wheels 13. The blade or plow 11 is adjustable by means of lever 14 controlled by a hand operated lever 15 to which is secured an operating rod or cable 16 that extends forwardly for operation by the driver of the tractor or other source of power (not shown). The blade 11 has a V-shaped entering point as shown in Figure 1, 17 designating a removable point for the blade or plow that is braced by means of the angle braces 18.

The plow or blade 11 has its rear portion 19 at an angle to the digging end of the plow, being inclined upwardly therefrom, as best shown in Figure 3, and is provided with a plurality of openings 20, and is transversely undulated or corrugated as shown at 21. Carried by the rear portion 19 of the blade or plow is an endless belt 22 carried by rollers 23 and 24. The roller 23 is journaled on supporting members 25 secured to the plow, while the roller 24 is journaled in blocks 26 that are slidably mounted in slotted openings 27 in supporting members 28, and adjustable relatively to the blade 19 by means of screws 29 rotatably mounted in the blocks and threadedly engaging a cross member 30 on each supporting member 28, 31 designating a jam nut to hold the screws 29 in adjusted position. 32 indicates transverse strips carried by the belt 22.

It will be apparent that the soil carrying weed roots dug up by the point 17 will be forced rearwardly on the blade 11 and upwardly on the rear portion of the blade 19, being carried along by the movement of the belt 22 and the cross strips 32 thereon, so that the soil will be agitated by the undulations or corrugations 21 and the soil deposited through the openings 20, the weed roots being carried rearwardly and finally being deposited from the downwardly inclined end 33 of the blade. A shaft 34 carrying the roller 23 is extended and provided with a sprocket wheel 35 that is geared by means of a chain 36 to a sprocket wheel 37 mounted on the axle 12.

38 indicates a conveyor belt having flights 39 secured thereto and trained on rollers 40 and 41, a shaft 42 and roller 40 being journaled in the frame 10, while the shaft 43 with the roller 41 is journaled in supports 44 secured to said frame. Shaft 43 is extended as shown in Figure 1 and provided with a pulley 44 and geared by means of a belt 45 with a pulley 46 secured to axle 12. 47 indicates supporting members for the rear end of the blade 11 and the belt 22, said supporting members engaging the shaft 34 for this purpose.

The rear end of the conveyor carrying the apron 38 is arranged to deposit material therefrom into a dumping scoop 48 that is supported by means of links 49 and 50 pivotally mounted on the frame 10. The arrangement of the links is such as shown in Figures 2 and 3, that when the material is deposited on the scoop and reaches a predetermined weight the scoop will move downwardly and rearwardly at its rear end and swing in an arc upwardly at its forward end to deposit the material thereon. 51 designates a contractile coil spring connecting the rear end of the scoop 48 and the frame 10 that normally holds the scoop in the position shown in the drawings and returns it thereto after each dumping operation, and the tension of the spring 51 determines the weight of the material required to operate the scoop into dumping position as heretofore described. 52 designates a hook member that is pivotally secured to the rear end of the scoop 48 and engages the upper edge of one of the side beams of the frame 10 to limit the scoop into dumping position.

What is claimed is:—

1. In a weed root gatherer of the class described, a scoop blade adapted to pick up loose soil and weed roots, a removable point on said blade, a portable frame pivotally mounting the blade, means to pivotally adjust the blade relatively to the frame, the blade provided with openings and transversely undulated to agitate the soil and weed roots for separation thereof and discharge of the soil through said openings, an endless belt arranged above the blade and adapted to move the soil and weed roots thereover and rearwardly thereof, traction wheels mounting said frame, and gearing connecting one of said wheels with said belt.

2. In a weed root gatherer of the class described, a dumping container for receiving the gathered roots, a frame mounting said container, links pivoted to the sides of the container and to the frame, the links on the rear end of the container inclined upward and away therefrom to insure dumping movement towards the rear of the frame, spring means normally maintaining the container in loading position, and hook members secured to the container to limit its movement to dumping position.

3. A weed root gatherer of the class described, comprising a scoop blade adapted to pick up loose soil and weed roots, said blade being perforated and provided with undulations to agitate the soil and shake it loose from the weeds and discharge the soil through said openings, an endless driven belt arranged above said blade to move said soil and weeds thereover, a conveyor at the discharge end of the blade to convey the weeds rearwardly, an automatic dumping container arranged to receive the weeds from the conveyor, a portable frame mounting said blade and conveyor, and traction wheels journaled on said frame and geared to said belt and conveyor.

In testimony whereof I affix my signature.

RALPH E. MONROE.